Oct. 1, 1940.  W. E. KEMP  2,216,240
GOVERNOR MECHANISM
Filed Dec. 24, 1937  2 Sheets-Sheet 1

INVENTOR.
WILLIAM E. KEMP.
BY Lockwood Goldsmith & Galt
ATTORNEYS.

Oct. 1, 1940.    W. E. KEMP    2,216,240
GOVERNOR MECHANISM
Filed Dec. 24, 1937    2 Sheets-Sheet 2
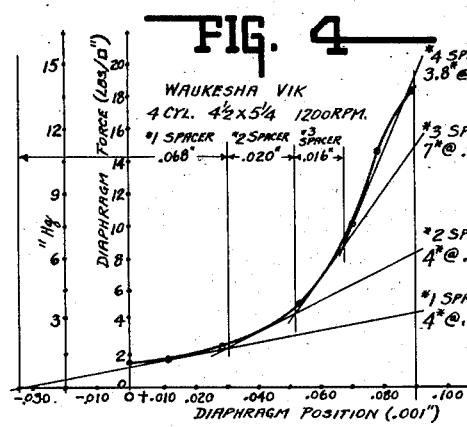
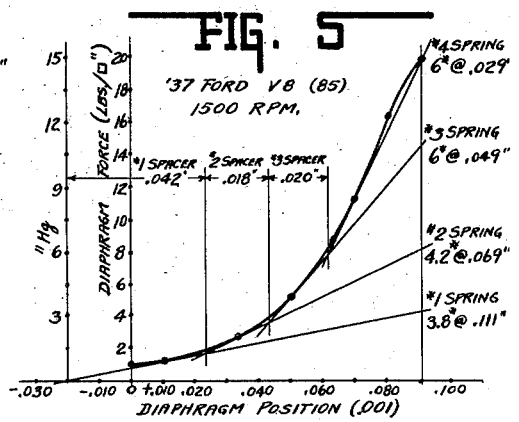
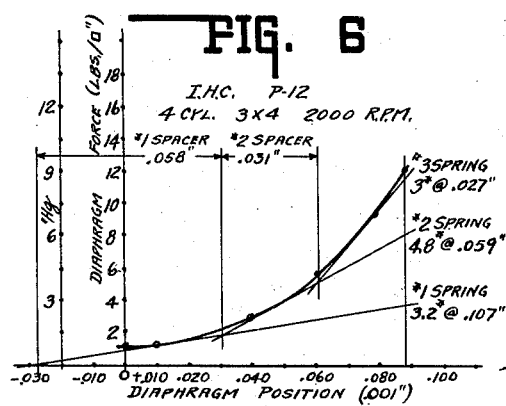
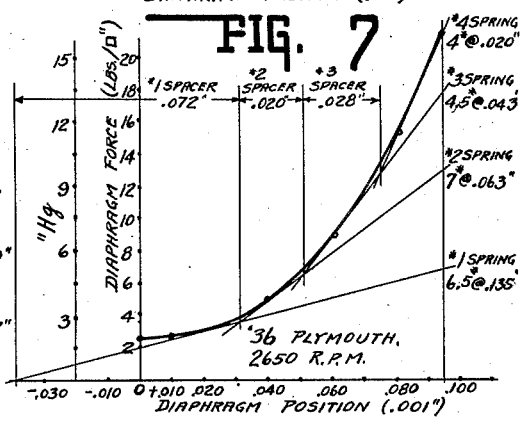
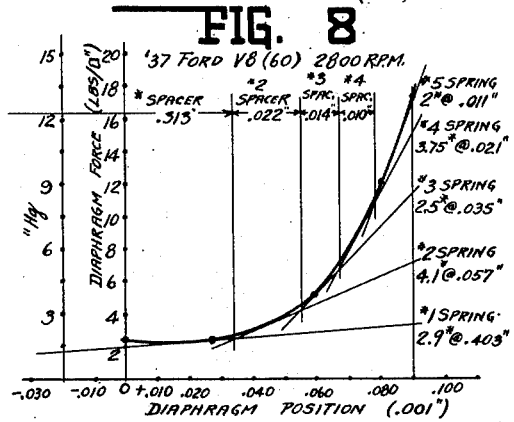
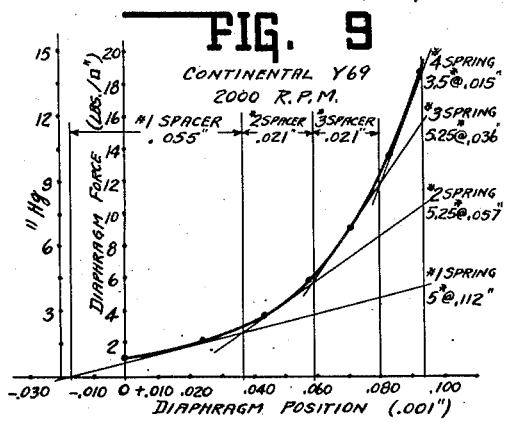
INVENTOR.
WILLIAM E. KEMP.
BY
ATTORNEYS.

Patented Oct. 1, 1940

2,216,240

UNITED STATES PATENT OFFICE 2,216,240

GOVERNOR MECHANISM

William E. Kemp, Orlando, Fla., assignor to Pierce Governor Company, Anderson, Ind., a corporation Application December 24, 1937, Serial No. 181,677

3 Claims. (Cl. 137—153)

This invention relates to a governor mechanism of the general type disclosed in the copending applications entitled "Governor mechanism," Serial No. 637,612, filed October 13, 1932; Serial No. 647,315, filed December 15, 1932, and Serial No. 655,040, filed February 3, 1933, now Patents No. 2,127,521, granted August 23, 1938, No. 2,140,529, granted December 20, 1938, and No. 2,140,530, granted December 20, 1938, respectively.

The chief object of the present invention is to simplify the specific embodiments of the basic invention disclosed in the aforesaid applications for mass production, whereby uniformity in operation will result from the present embodiments within the close tolerance limits now required in and by the automotive industry.

Another object of this invention is to produce a device embodying the basic invention which is not only more economical to produce but which may by changing but a few parts be readily adapted for application to substantially all kinds of automotive engines.

The chief feature of the present invention consists in the production of devices whereby the foregoing objects are accomplished.

Minor objects and features will be set forth hereinafter.

The full nature of the invention will be understood from the accompanying drawings and the following description and claims;

In the drawings

Figs. 4 to 9, inclusive, are representative force-deflection diagrams for governors adapted for individual engines, the curved line of each representing the composite governor action, and the several tangents thereto representing the individual characteristics of the several successively operative springs, these diagrams having been plotted from actual governor applications to the respective engines hereinafter noted, so that the desired control is obtained for each engine determined by its operating characteristics and the power functions to be obtained therefrom.

Fig. 4 is a diagram for a Waukesha-VIK 4-cylinder engine governor.

Fig. 5 is a diagram for a 1937 Ford V-8 (85) engine governor.

Fig. 6 is a diagram for an International Harvester P-12, 4-cylinder engine governor.

Fig. 7 is a diagram for a 1936 Plymouth engine governor.

Fig. 8 is a diagram for a 1937 Ford V-8 (60) engine governor.

Fig. 9 is a diagram for a Continental Motor Y-69 engine governor.

The foregoing application discloses describe the general arrangement and operation of the basic invention also embodied in the present disclosure and the same are, therefore, made a part hereof.

Briefly summarized, it may be stated that the speed control mechanism of the governor for an internal combustion engine is actuated by the vacuum or difference in pressure which exists in the intake manifold, together with its connecting chambers, of an internal combustion engine, at a point above the engine throttle valve, and pressure of the outside atmosphere and so arranged that the force acting upon the throttle valve by increasing vacuum is counteracted by spring means and pressure bleed.

Figure 1:
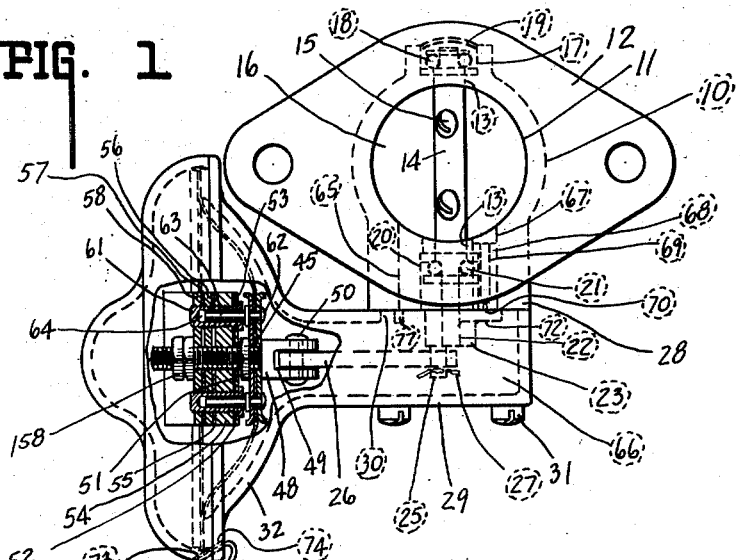
Fig. 1 is a plan view of one form of the invention, parts being broken away to show other parts in detail, certain of the same being shown in section for a clearer illustration thereof.
Figure 2:
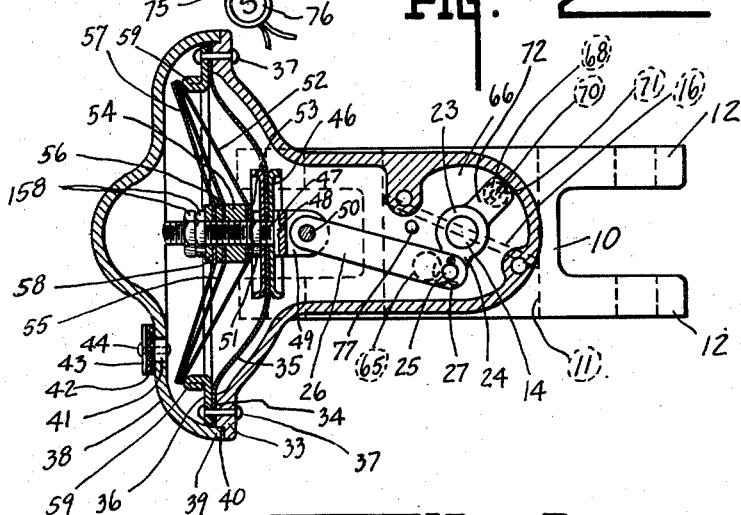
Fig. 2 is a longitudinal sectional view of the control portion of the governor.

In Figs. 1 and 2 of the drawings, 10 indicates an adapter type body portion having passage 11 therethrough and flanges 12 for connection to an intake manifold or the like, and a carburetor. Aligned bores 13 receive shaft 14 to which is suitably secured at 15 a butterfly throttle valve 16.

One bore 13 is enlarged at 17 and mounts an anti-friction structure 18. The outer end of the bore may be sealed by a press fitted cap or disc 19. The other bore is enlarged at 20 and mounts an anti-friction structure 21. The projecting end 22 of the shaft has secured to it a bellcrank shaped member 23, one arm 24 of which mounts pin 25 that mounts one end of link 26. The latter is secured by cotter key 27.

Figure 3:
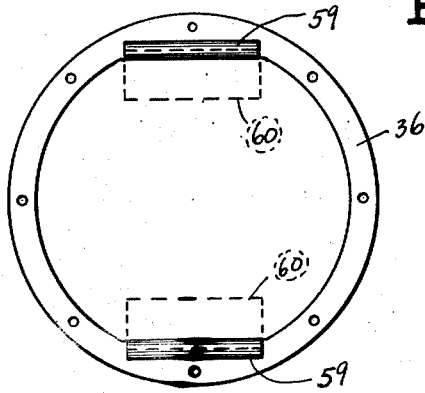
Fig. 3 is an elevational view of the diaphragm retaining and spring bearing member, the dotted lines indicating the bearing portions prior to bearing formation therefrom.

The body 10 has a boss 28 projecting laterally of the passage 11 and in alignment with the shaft axis. A tubular type housing 29 at one end has a lateral opening 30 exposed to the face of the boss and is secured thereto by bolts 31. The opposite end terminates in a bell-shaped enlargement 32 including a terminal flange 33 providing an anchoring seat 34 for a flexible diaphragm 35. An opposite seat and retainer ring 36, see Fig. 3, is suitably secured to flange 33 as at 37, see Fig. 2.

A cover cap 38 has its end 39 seated in groove 40 formed in flange 33. Cover cap 38 includes aperture 41 protected by a felt, screen, or filter member 42 secured by members 43 and 44 to the cap. The cap and diaphragm form the spring chamber of the governor.

The diaphragm 35 is centrally apertured at 45. Two apertured and rimmed plates 46 are positioned at opposite sides of the diaphragm and the rims are oppositely directed and constitute stiffening portions. Member 47 having head portion 48 bears against one disc 46. Head portion 48 is elongated and slotted as at 49 and between the ears thereof and thereto is pivotally secured by pin 50 the opposite end of link 26. Member 47 is threaded and nut 51 rigidly clamps together, through head 48, the diaphragm and adjacent plates.

The member 47 is elongated and extends into the spring chamber before mentioned. A flat leaf spring member 52 is mounted on member 47. Also thereon is a spacing block 54, then another elongated rectangular similar spring leaf 55, then a smaller spacer 56, then another similar spring leaf 57 and then an anchor plate or bar 58. A pair of nuts 158 adjust the position of the spring unit on the member 47 and lock the unit in said position. There may be provided, for bearing purposes, later to be described, an opposite plate or anchor bar 53.

The ring 36 has two diametrically opposite spring bearing portions 59 projecting therefrom and into the spring chamber. These are formed integral with the ring and form tongues 60— see Fig. 3. It is to be understood that in one operative position at least spring 52 at its ends contacts the bearing portions 59 and usually in this position the ends of the other leaves do not, but as the vacuum pulls on the diaphragm to an increasing degree, the successive springs to the left—see Fig. 2—successively engage the ends of the spring to the right.

To facilitate alignment, accuracy, assembly and unit mounting, there is herein provided two tubular bolts 61 which—see Fig. 1—pass through all springs, spacers and members 53 and 58. Rivets 62 securing plates 46 and diaphragm 35 together are elongated as at 63 and extend into the spring chamber and are slidably received by bores 64 in the tubular bolts 61. Thus the spring and diaphragm structures are arranged for assembly as a unit requiring subsequent connection at one end to link 26 and at the opposite end bearing on the portions 59 when ring 36 is secured to flange 33 to anchor the unit in place.

A passage herein shown in the form of a bore 65 extends through body 10 and at one end communicates with passage 11 therein and at its opposite end communicates with chamber 66 closed at the opposite end by diaphragm 35. Hence, diaphragm 35 is subject to the vacuum force in passage 11 and movement is opposed by the spring structure.

A similar bore 67 is parallel to the shaft axis and extends from passage 11 to chamber 66. Therein is a sleeve 68 having passage 69 terminating in a calibrated, restricted port arrangement 70 at the end adjacent chamber 66. This end is kerfed at 71. The other arm 72 of lever 23 is arranged to "wipe" the end of the sleeve 68. Thus, the communication through port 70 is controlled by arm 72.

The operation of the device basically is substantially the same as that set forth in application Serial No. 647,315, filed December 15, 1932, and now Patent No. 2,140,529, so that no further description thereof herein is believed necessary.

It, of course, will be understood that the number of springs to be employed in the spring unit will be determined by the performance desired and the engine characteristics of the engine to which the device is applied. Also, the strength of the several springs may be varied, as well as the intervals between successive spring applications, the latter chiefly being obtained by variation in the thickness of the several spacers.

The heavy black, parabolic like curves in Figs. 4 to 9 are curves of diaphragm position or displacement plotted against diaphragm opposing force.

In one application, for example, spring 52 is .010" in thickness, spacer 54 is .182" in thickness, spring 55 is .014" in thickness, spacer 56 is .018" in thickness, and spring 57 is .0245" in thickness. These reference numerals are used merely to designate the relative spring and spacer positions.

Fig. 8 indicates employment of five springs, Figs. 4, 5, 7 and 9 employment of four springs and Figs. 1, 2 and 6 employment of only three springs. In Fig. 8 the third spacer is .014" in thickness and the fourth spring is .021" in thickness. The outer and inner members—see plates 57 and 53 Figs. 1 and 2—may be of any desired thickness.

In example illustrated in Fig. 8 each spring in succession from the spring closest to the diaphragm is of increasing thickness although all have substantially the same width and length; also each spacer in succession from the spacer closest to the diaphragm is of decreasing thickness although all have substantially the same width and length. The spacers and springs preferably have a common width. All springs are not of the same strength as will be apparent from a close examination of Figs. 4 to 9, inclusive. Also, these figures indicate that in some instances, spacers are of equal thickness—see Fig. 9—or an intermediate spacer may be of greater thickness—see the third spacer in Figs. 5 and 7.

It is quite evident that the desired parabolic like curve effect can be obtained by varying the several thicknesses in the spacers, the springs, or both. Reference is had to Figs. 4 and 5 as compared to Figs. 6 to 9, inclusive. Note, that the second last plotting point on these curves is slightly "off" from a theoretical, parabolic like smooth curve. Use of a slightly different third and/or fourth spring, either as to force or thickness and/or a different spacer therebetween would remedy such condition.

However, all these curves are shown since they represent forms of this invention having the spacers and springs designated and as actually applied to the specific engines designated.

No further description or explanation is believed necessary to a complete understanding of what these Figs. 4 to 9 are intended to illustrate.

The cover cap 38, see Fig. 1, may be apertured at 73 which registers with aperture 74 in flange 33. A sealing wire 75 may be passed therethrough and a lead seal 76 secures the free ends together. This requires seal breakage to remove the cover cap for governor adjustment so that breakage of the seal arrangement indicates unauthorized tampering with the governor.

A stop pin 77 is arranged for preventing movement of the link and arm connection in a direction opposed to normal movement and into and beyond the aligned position thereof.

While the invention has been illustrated and described herein in great detail, the same is to be considered illustrative and not restrictive in character. The invention as thus described and illustrated, as well as other modifications thereof hereinbefore suggested, together with other modifications which will readily suggest themselves to persons skilled in this art, are all considered to be within the broad scope of the invention, reference being had to the appended claims.

The invention claimed is:

1. In a vacuum governor for an engine the combination with a control valve connected arm, a diaphragm and a spring constrained diaphragm support, of a link directly connecting said support to said arm, the diaphragm sealing a chamber in which said arm is positioned, the chamber being responsive to engine suction, the chamber pressure being controlled by the arm, and stop means limiting link movement in one direction of valve arm rotation.

2. In a vacuum governor for an engine the combination with a diaphragm, a chamber responsive to engine suction and including the diaphragm and a spring means external of the chamber and imposing constraint upon the diaphragm in opposition to engine suction, of a diaphragm retainer peripherally anchoring the diaphragm periphery, the spring means having operative connection to the diaphragm centrally thereof and extending radially outward therefrom toward the retainer, and curved shaped portions on said retainer in registration with the spring means outwardly extending portions and integral with said retainer.

3. In a vacuum governor for an engine the combination with a diaphragm, a chamber responsive to engine suction and including the diaphragm and a spring means external of the chamber and imposing constraint upon the diaphragm in opposition to engine suction, of a diaphragm retainer peripherally anchoring the diaphragm periphery, the spring means having operative connection to the diaphragm centrally thereof and extending radially outward therefrom toward the retainer, curved shaped portions on said retainer in registration with the spring means outwardly extending portion and integral with said retainer, a cover for said spring means including a venting aperture, and filter means carried by the cover for the aperture.

WILLIAM E. KEMP.